United States Patent [19]

Ihara et al.

[11] 4,429,626
[45] Feb. 7, 1984

[54] JUICE EXTRACTOR DEVICE

[75] Inventors: Keisuke Ihara, Kasukabe; Kazuo Toda, Tokyo; Shozi Hoshino, Sagamihara, all of Japan

[73] Assignee: Tokyo Electric Co., Ltd., Tokyo, Japan

[21] Appl. No.: 258,900

[22] Filed: Apr. 30, 1981

[51] Int. Cl.³ .............................................. A23N 1/02
[52] U.S. Cl. ..................................... 99/510; 99/513; 100/117; 100/145; 366/89; 366/323
[58] Field of Search ................ 99/348, 483, 495, 509, 99/510, 513; 100/117, 145, 147, 148; 425/207, 208, 198; 241/260.1; 210/173, 174, 405, 450; 366/81, 88–90, 318, 319, 323

[56] References Cited

U.S. PATENT DOCUMENTS

| 2,109,398 | 2/1938 | McNih | 99/513 X |
| 2,315,028 | 3/1943 | Thomas | 99/513 |

*Primary Examiner*—Timothy F. Simone
*Attorney, Agent, or Firm*—James E. Nilles

[57] ABSTRACT

A juice extractor device comprises a juice extractor body having a horizontally disposed slightly conical internal bore and a rotary body mounted in said bore. The juice extractor body includes a material inlet port on the upper side of the base end of the extractor body, a juice discharge port along the lower side of the extractor body, and a residuum discharge port on the upper side of the outer end of the body, and each port communicates with the bore. The juice discharge port includes a filter whose inner surface has a curvature equal to that of the bore surface. The rotary body is disposed adjacent all the ports and comprises an outer circumferential surface which has a spiral compressing portion confronting the two discharge ports and a spiral blade confronting the inlet port. The spiral compressing portion comprises a spiral wing and a valley therealong. The spiral blade, which is continuous with the spiral wing, also comprises a valley therealong. The gap between the valley of the spiral compressing portion and the surfaces of the bore and the filter is not more than 6 mm along a major portion of the spiral compressing portion. The gap between the spiral wing and the aforementioned surfaces is not more than 2 mm. These gaps each decrease in size in the direction preceding from the material inlet port toward the residuum discharge port.

1 Claim, 8 Drawing Figures

JUICE EXTRACTOR DEVICE

BACKGROUND OF THE INVENTION

1. Field of the Invention

This invention relates to a juice extractor device, in which a material is cut and squeezed by using a spiral rotary body, to obtain juice therefrom.

2. Description of the Prior Art

A conventional juicer is provided with a disc type rotary blade rotating at a high speed, and a centrifugal separator cage surrounding the rotary blade and rotated in accordance therewith. A material is pressed by a push rod against the rotary blade so as to be cut and crushed as the rotary blade and separator cage are rotated at a high speed. The liquid contained in the material is extracted from small bores formed in the centrifugal separator cage, while by a rotary centrifugal force the residuum is discharged in the upward direction along the inner surface of the centrifugal separator cage. Unless a large centrifugal force is used, the liquid cannot be extracted from the material in this conventional juicer. In other words, it is necessary that the blade be rotated at a high speed or at approximately not less than 10,000 r.p.m. Moreover, the centrifugal separator cage has a large diameter, and generates a great rotational noise. Since the rotary blade is also rotated at a high speed, it generates a great material-cutting and crushing noise. Therefore, the juicer as a whole generates a very loud noise.

The centrifugal separator cage has a large diameter, and is rotated at a high speed, so that it requires a high balance accuracy. The residuum left after the material has been cut and crushed is moved upwardly along the inner surface of the centrifugal separator cage by the centrifugal force generated thereby. The residuum then impinges upon the inner surface of a cover for a case, which is positioned above the centrifugal cage, to be discharged by air pressure into a residuum receptacle disposed on one side of the centrifugal separator cage. Consequently, the residuum easily sticks to the inner surface of the centrifugal separator cage. When the residuum sticks to the inner surface of the separator cage unevenly, the separator cage loses its balance and generates a loud sound of vibration. Since the centrifugal separator cage is rotated at a specially high speed, even a small amount of unevenly stuck residuum causes the balance of the separator cage to be lost.

When the liquid from the material which has been cut and crushed with the rotary blade flows through the small bores in the centrifugal separator cage, air is mixed therein. The liquid is then guided into a liquid passage formed around the centrifugal separator cage while the liquid is moved around the centrifugal separator cage by air pressure generated by the rotation thereof. As a result, bubbles occur in the juice, and sarcocarp particles and liquid particles are separated from one another easily. Since the juice contacts the air as mentioned above, the vitamins contained in the juice are destroyed early, and the nutritive value thereof is liable to be decreased.

The residuum readily sticks to the centrifugal separator cage, case and cover. Especially, fibrous residuum is firmly embedded in small bores in the centrifugal separator cage, so that it takes much time to wash the separator cage after it has been used. In fact, the washing of such a separator cage is very troublesome.

A juicer employing a spiral rotary body is also known from Japanese Utility Model Application Publication No. 1,990/1954 and Japanese Utility Model Application Publication No. 1,193/1959. The juicers disclosed in these publications have a construction, in which materials are compressed as they are transferred by a spiral wing. In these juicers, the materials are compressed to one another to cause the juice contained therein to flow out therefrom. Accordingly, the materials are discharged as residua before sufficient juice has been extracted therefrom. Furthermore, the juice contains little nutritive substances, such as sarcocarp.

SUMMARY OF THE INVENTION

An object of the present invention is to eliminate the above-mentioned drawbacks encountered in a conventional juicer.

Another object of the present invention is to provide a juice extractor device comprising a juice extractor body having a juice discharge port at an outer end portion thereof, and a filter provided in the juice discharge port; and a rotary body rotatably disposed in the juice extractor body and having a spiral compressing portion opposed to the juice discharge port, a material being compressed between the compressing portion and the inner surfaces of the juice extractor body and filter as the material is transferred gradually by the rotation of the rotary body toward the outer end of the juice extractor body, to extract juice from the material, a gap between the compressing portion and the inner surfaces of the juice extractor body and filter being restricted to not more than 5 mm to thereby increase the juice extraction rate.

The above and other objects as well as advantageous features of the invention will become apparent from the following description of the preferred embodiment taken in conjunction with the accompanying drawings.

DESCRIPTION OF THE PREFERRED EMBODIMENT

Figure 1:
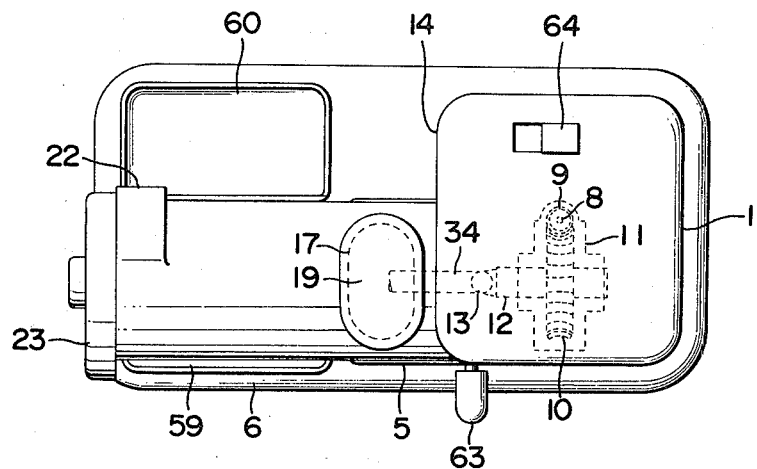
FIG. 1 is a plan view of a juice extractor device embodying the present invention.
Figure 2:
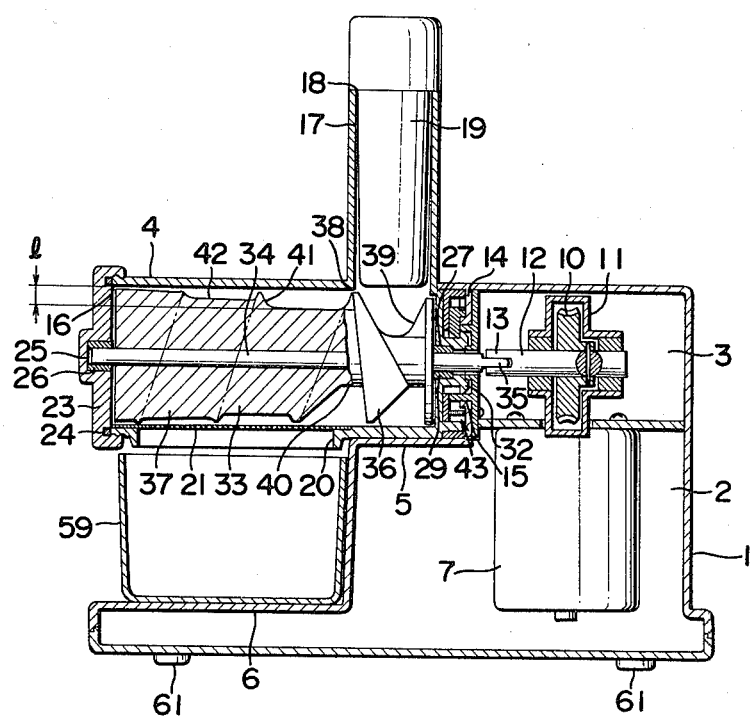
FIG. 2 is a front elevational view in longitudinal section of the embodiment shown in FIG. 1.
Figure 3:
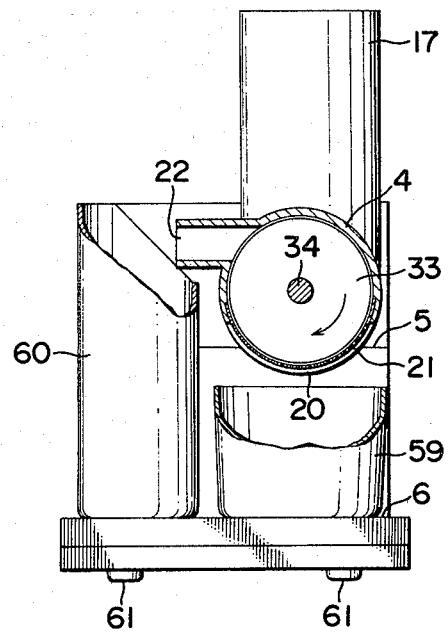
FIG. 3 is a partially cutaway view in side elevation of the embodiment shown in FIG. 1.
Figure 4:
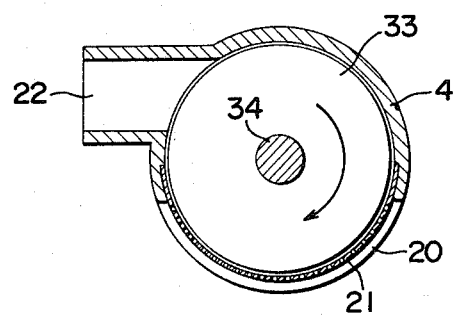
FIG. 4 is a longitudinal sectional view of a juice extractor body in the embodiment shown in FIG. 1.
Figure 5:
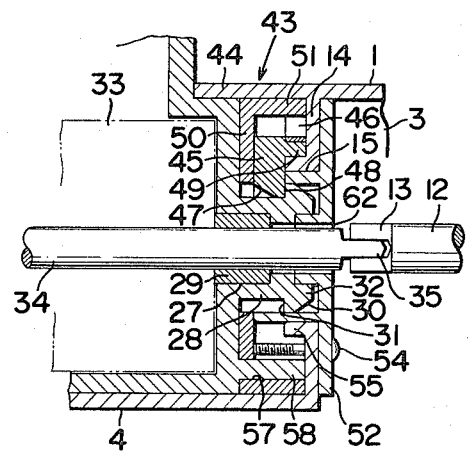
FIG. 5 is a sectional view of a clamp mechanism employed in the embodiment shown in FIG. 1.
Figure 6:
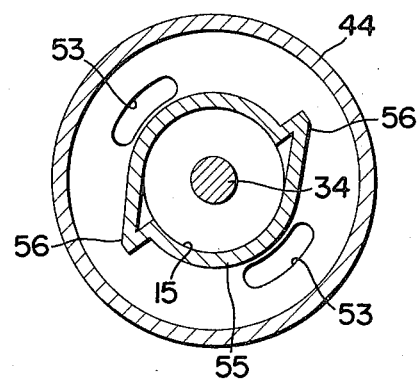
FIG. 6 is a front elevational view of a guide, which is formed on a side wall of a support body, for the clamp mechanism shown in FIG. 5.

Referring to the drawings, reference numeral 1 denotes a juice extractor support body having therein an electric motor housing chamber 2, and a driving gear housing chamber 3 which is formed on the electric motor housing chamber 2. The driving gear housing chamber 3 formed in the juice extractor support body 1 has at one side thereof a stepped bottom portion constituting a support base 5 for a juice extractor body 4. The electric motor housing chamber 2 has at one side thereof a stepped upper portion constituting a base 6 on which a juice receptacle and a residuum receptacle are placed.

A rotary shaft 8 of an electric motor 7, which is fixed to the electric motor housing chamber 2 in the support body 1, is projected into the driving gear housing chamber 3. A worm gear 9 is provided at that end portion of the rotary shaft 8 which is projected into the driving gear housing chamber 3. A wheel gear 10, which is meshed with the worm gear 9, is mounted on a driving shaft 12 horizontally supported in a reduction gear case 11 provided in the driving gear housing chamber 3. The driving shaft 12 has a coupling portion 13 at one end thereof. A shaft passing bore 15 is provided in a vertical wall 14 of a stepped portion of the support body 1, and the bore 15 is opposed to the coupling portion 13 of the driving shaft 12. The coupling portion 13 is positioned on the inner side of the vertical wall 14, and adapted not to be exposed to the outside of the support body 1.

The juice extractor body 4 mentioned above is formed substantially cylindrically with a synthetic resin, and the inner diameter of the extractor body 4 increases gradually toward an outer open end portion 16 thereof. The juice extractor body 4 is extended horizontally with respect to the axis thereof, and supported at a base portion thereof on the support base 5, a part of the support body 1. A cylindrical inlet port 17 for material is provided at an upper section of the base portion of the juice extractor body 4, which is supported on the support base 5. A push rod 19 for use in pressing a material is vertically movably inserted into the inlet port 17 from an upper open end 18 thereof. A juice discharge port 20 is provided in a lower section of the outer end portion, which is projected from the support base 5, of the juice body 4. A filter 21 consisting of an arcuate plate having a plurality of small bores are detachably provided in the juice discharge port 20 in such a manner that the curvature of the inner surface of the filter 21 is equal to that of the inner circumferential surface of the juice extractor body 4.

A residuum discharge port 22 is provided at a rear section of the outer end portion of the juice extractor body 4 in such a manner that the residuum discharge port 22 is extended substantially in the tangential direction with respect to the inner surface of the juice extractor body 4. The residuum discharge port 22 is positioned substantially halfway between both of circumferential edges of the juice discharge port 20 to allow the residuum of a pressed material passing the filter 21 to be discharged therefrom.

The outer open end portion 16 of the juice extractor body 4 is closed with a cover 23 removably screwed thereto via a packing 24. The cover 23 is provided in the central portion of an inner surface thereof with a bearing setting recess 25, in which a bearing 26 consisting of a metal or a synthetic resin is fitted firmly.

A base end wall of the juice extractor body 4 is provided in the central portion thereof with a shaft supporting bore 27, and a cylindrical bearing support 28 outwardly projected from and integrally formed with that portion of the base end wall of the juice extractor body 4 which is outside of the shaft supporting bore 27. A bearing 29 consisting of a metal or a synthetic resin is fitted firmly in the bearing support 28.

The bearing support 28 is provided on the outer circumferential surface of an outer end portion thereof with a clamp hook 32 having an engagement guide surface 30 inclined with respect to the axis of the bearing support 28, and a stopper surface 31 continuing from the guide surface 30.

Reference numeral 33 denotes a rotary body, and a rotary shaft 34 passed through, and projected from both end surfaces of, the rotary body 33 is rotatably supported on the bearings 26, 29. The rotary shaft 34 has a coupling portion 35 at a base end thereof, and the coupling portion 35 is projected outwardly from the bearing support 28 and adapted to be engaged with and disengaged from the coupling portion 13 of the previously mentioned driving shaft 12. The rotary body 33 is set in such a manner that the axis thereof is substantially in agreement with that of a substantially cylindrical inner surface of the juice extractor body 4.

The rotary body 33 has a spiral blade 36 and a compressing portion 37 on an outer circumferential surface thereof. The blade 36 is positioned under the inlet port 17 of the juice extractor body 4. The blade 36 has a blade surface 39 directed toward the outer end of the juice extractor body 4 to allow a material, which has been inserted from the inlet port 17, to be cut with the blade 36 and an end portion 38, which is opened into the juice extractor body 4, of the inlet port 17. The diameter of a valley 40 formed along the blade 36 is increased sharply toward the outer end of the rotary body 33. The compressing portion 37 of the rotary body 33 has a spiral wing 41 continuing from the spiral blade 36 mentioned above, to allow a material to be transferred to the outer end of the rotary body 33 by a unidirectional rotation thereof. The diameter of a valley 42 formed along the spiral wing 41 is increased gradually toward the outer end of the rotary body 33. Accordingly, a gap l between the surface of the valley 42 and the inner surfaces of the juice extractor body 4 and filter 21 is decreased gradually toward the outer end of the rotary body 33. The outer diameters of the spiral blade 36 and wing 41 are increased gradually toward the outer end of the rotary body 33 in accordance with the inner diameter of the juice extractor body 4. A gap between the inner surface of the juice extractor body 4 and the outer circumferential edges of the blade 36 and wing 41 is approximately not more than 2 mm.

A gap l between the surface of a recess 42 in the compressing portion 37, which is positioned in that section of the rotary body 33 which is opposed to the juice discharge port 20, and the inner circumferential surfaces of the juice extractor body 4 and filter 21 shall be approximately not more than 6 mm.

A clamp mechanism 43 for use setting the clamp hook 32, a part of the juice extractor body 4, in an engaged state will be described.

The clamp mechanism 43 consists of a plurality of clamp members 45 provided in an annular frame 44 formed on an outer surface of the side wall 14 of the support body 1 previously mentioned. Each of the clamp members 45 has an inwardly extended projection 49, which is urged by a spring 46 toward the center of the clamp mechanism 43, so that each of the clamp members 45 can be moved radially. Each of the clamp members 45 has an inclined engagement surface 47, at which the clamp member 45 is pressed by the guide surface 30 of the clamp hook 32 in the outward direction against the resilient force of the spring 46, and an engagement surface 48 stopped by the stopper surface 31 of the clamp hook 31. The clamp members 45 are housed in a cylindrical clamp support body 50, and the above-mentioned spring 46 is secured to an inner surface of a circumferential wall 51 of the clamp support body 50. The clamp support body 50 is joined to a support plate 51, which contacts an inner surface of the side wall 14 of the support body 1 and which has a shaft passing bore 62, with screws 54 inserted into elongated arcuate slits 53 provided in the side wall 14.

An annular guide 55 is provided on that portion of the side wall 14 which is on the outside of the shaft passing bore 15, and the annular guide 55 is engaged with the projections 49 of the clamp members 45. The annular guide 55 is provided with clamp release portions 56 projected outwardly therefrom, by which the projections 49 of the clamp members 45 are urged outwardly against the springs 46.

Projections 58 are provided on a base end surface of the juice extractor body 4. The projections 58 are adapted to be engaged with and disengaged from an engagement bores 57 provided in the clamp support body 50. The clamp support body 50 is provided with a knob 63, which is projected outside the juice extractor body 4 from a circumferentially extended guide recess (not shown). Reference numeral 59 denotes a juice receptacle placed on the base 6, a part of the support body 1, and under the juice discharge port 20 of the juice extractor body 4.

Reference numeral 60 denotes a residuum receptacle placed on the base 6, a part of the support body 1, in such a manner that the residuum receptacle 60 is positioned adjacent to the juice receptacle 59. An upper end of the residuum receptacle 60 is opened in opposition to the residuum discharge port 22 mentioned above and provided in the juice extractor body 4.

The support body 1 is provided on a lower surface thereof with a plurality of feet 61 made of rubber, at least one of which is positioned on the outer side of the previously mentioned support base 5.

The use of this juice extractor device will now be described.

The base end portion of the juice extractor body 4 is slidingly moved on the support base 5, and the clamp hook 32 is inserted through the shaft passing bore 15. The clamp members 45 are then pressed by the clamp hook 32 against the springs 46. As a result, the clamp hook 32 is locked by the clamp members 45 with the rotary shaft 34 connected to the driving shaft 12 via the couplings 13, 35. Also, the projections 58 come into engagement with the engagement bores 57 provided in the clamp support body 50. The juice extractor body 4 is then horizontally supported on the support base 5, a part of the support body 1.

When a switch 64 is then closed, the electric motor 7 is driven to allow the driving shaft 12 to be reduction-rotated via the worm gear 9 and worm wheel 10 at approximately 200-300 r.p.m. As a result, the rotary shaft 34, which is rotatably connected to the driving shaft 12 via the couplings 13, 35 is rotated. A material to be treated is inserted into the inlet port 17 and crushed by the push rod 19, so that the material is transferred by the spiral blade 36 toward the outer end of the rotary body 33 as the material is cut with the blade 36 and end portion 38 of the inlet port 17. The material, which has been cut in the above-mentioned manner, is sent to the compressing portion 37 having a spiral wing 41 continuing from the blade 36. The diameter of the valley 42 extending along the spiral wing 41 of the compressing portion 37 is increased gradually, so that the material is crushed and broken in order between the inner surface of the juice extractor body 4 and the surface of the valley 42. The extracted liquid flows to the juice discharge port 20 provided in the lower portion of the juice extractor body 4, through the small bores in the filter 21 to drop into the juice receptacle 59. In the meantime, the residuum consisting of fiber is discharged from the discharge port 22 into the receptacle 60.

The residuum discharge port 22 is provided at an upper portion of the juice extractor body 4, which is on the downstream side of the juice discharge port 20 with respect to the direction of rotation of the rotary body 33. Therefore, the residuum left after the liquid has been extracted from the material at the juice discharge port 20 is discharged in a concentrated manner without absorbing liquid again therein. This allows the juice extracting efficiency to be improved.

Figure 7:
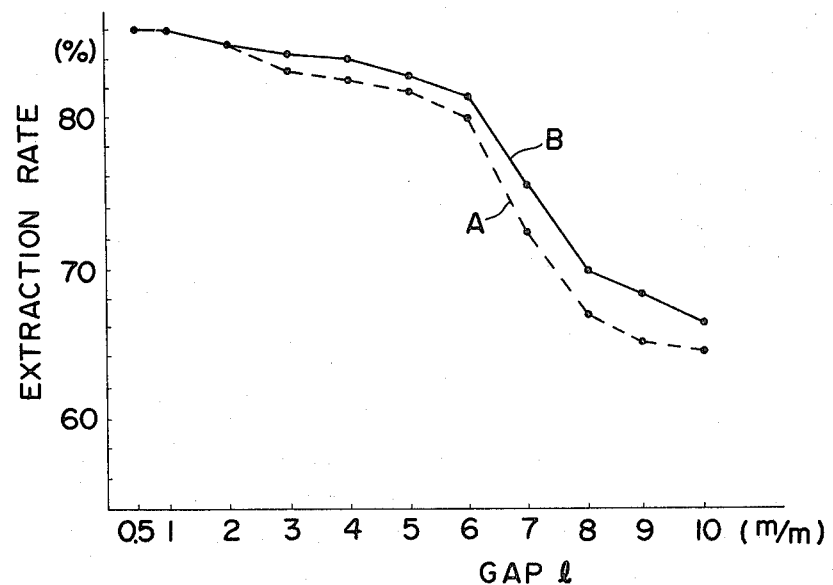
FIG. 7 is a graph showing juice extraction rates obtained in juice extracting operations conducted by using the juice extractor device according to the present invention.
Figure 8:
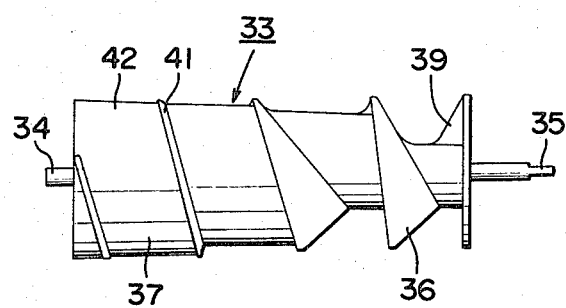
FIG. 8 is a front elevational view of a rotary body.

According to the present invention, the gap l between the surface of the valley 42 in the compressing portion 37 of the rotary body 33 and the inner surfaces of the juice extractor body 4 and filter 21 is set to not more than 6 mm. Therefore, when this juice extractor device is applied to the extraction of juice from tangerines to measure a juice extraction rate A with the residuum discharge port 22 opened, and a juice extraction rate B with the discharge port 22 closed, body the rates A, B exceed 80% as shown in FIG. 7.

Since the gap between the spiral blade 36 and spiral wing 41 continuing therefrom on the rotary body 33 and the inner surfaces of the juice extractor body 4 and filter 21 is set to not more than 2 mm, the material to be treated is transferred reliably toward the outer end of the rotary body 33.

The rotary body 33 is set horizontally on the support body 1. The residuum is transferred toward the outer end of the rotary body 33, while the juice flows to the juice discharge port 20 provided at a lower portion of the juice extractor body 4. Thus, the liquid and residuum are separated excellently. In fact, the residuum and liquid do not flow into the support body 1, nor do they flow into the electric motor 7 and driving rear housing chamber 3.

The inlet port 17 in the juice extractor body 4 is supported on the support base 5 provided as a part of the support body 1 and at least one of the support feet 6 of the support body 1 is positioned on the outer side of the support base 5, so that a pressing force applied to the material when the push rod 19 is pressed can be received at the support base 5. Accordingly, the juice extractor body can be supported stably, and a juice extracting operation can be carried out in a stable condition.

After a juice extracting operation has been completed, the knob 63 is pushed upwardly, so that the clamp support body 50 is rotated to allow the clamp members 45 to be slidingly moved along the guide 55 formed as a part of the support body 1. As a result, the clamp members 45 are pushed outwardly against the springs 46 by the clamp members 45 are disengaged from the clamp hook 32. The juice extractor body 4 can then be removed from the support body 1.

The juice extractor body 4 can also be removed by rotating the same to turn the clamp support body 50 by the projections 58 provided on the former.

After the juice extractor body 4 has been removed from the support body 1, the cover 23 is removed from the former, so that the rotary body 33 is ready to be withdrawn from the open end portion 16. Since the spiral blade 36 on and compressing portion 37 of the rotary body 33 are integrally formed, the rotary body 33 can be easily handled when it is withdrawn from the juice extractor body 4. Moreover, the inner diameter of the juice extractor body 4 is increased toward the open end portion 16 thereof, and the outer diameters of the blade 36 on and compressing portion 37 of the rotary body 33 are also increased toward the outer end thereof. Consequently, the rotary body 33 can be inserted and removed easily, and the juice extractor body 4 and rotary body 33 can be washed easily.

In the above-described embodiment, the driving gear 12 is reduction-driven by the electric motor 7 via the worm gear 9 and wheel gear 10. The driving gear 12 may be operatively connected to the rotary shaft 8 via a belt.

The rotary shaft 34 of the rotary body 33 is coupled with the driving shaft 12 in the driving gear housing chamber 3. Therefore, the driving shaft 12 is rotated without exposing itself to the outside of the support body 1, so that there is no possibility that the user touches the driving shaft 12 by accident. However, the driving shaft 12 may be connected to the rotary shaft 34 of the rotary body 33 outside the support body 1.

The rotary shaft 34 is inserted through the rotary body 33 in the above-described embodiment. This rotary shaft 34 may be substituted by rotary shafts projected from both ends of the rotary body 33. The cover 23 may be detachably provided at both ends of the juice extractor body 4, and the bearing 29, from which the coupling portion 35 of the rotary shaft 34, may be provided in the cover set on the base end of the juice extractor body 4. The coupling portions 35, 13 of the rotary shaft 34 and driving shaft 12 may be separately formed.

It is not necessary that the whole of the inlet port 17 with respect to the cross-sectional area thereof be supported on the support base 5 formed as a part of the support body 1 for the juice extractor body 4. When the support base 5 is formed to a size large enough to support a part of the inlet portion 17, an unduly large force is not applied to the clamp mechanism including the clamping members 45 while a material is pressed by the push rod 19.

According to the present invention, a juice discharge port having a filter is provided in a lower section of an outer end portion of a juice extractor body having a substantially cylindrical inner surface, and a gap between a spiral compressing portion of a rotary body disposed rotatably in opposition to at least the juice discharge port of the juice extractor body and the inner surfaces of the juice extractor body and filter is set to at least not more than 6 mm. Accordingly, a material transferred in order toward an outer end of the juice extractor body by the rotation of the rotary body is compressed between the compressing portion of the rotary body and the inner surfaces of the juice extractor body and filter to allow the liquid in the material to flow out through the filter. When tangerines in particular are subjected to juice extraction in this juice extractor device, tangerine juice can be obtained at a greatly improved extraction rate of not less than 80%. Since the juice discharge port is provided in a lower section of the juice extractor body, the liquid extracted from the material naturally flows out therefrom. The juice thus obtained has substantially no air content, so that the separation of particles of the juice does not substantially occur. In fact, juice of a high nutritive value in which vitamins are not destroyed can be obtained.

In the juice extractor device according to the present invention, a gap between the compressing portion of the rotary body and the inner surfaces of the juice extractor body and filter is gradually decreased toward the outer end of the juice extractor body. Accordingly, a material can be compressed gradually with no unduly large load applied to the rotary body. Owing to the gradually decreased compressing gap, the liquid which has once extracted from the material is not absorbed in the residuum thereafter, so that the extraction rate can be improved.

Furthermore, the juice and residuum are not scattered during a juice extracting operation, and the juice extractor body and parts provided therein can be washed easily. Since the rotary body is rotated at a low speed, noise can be minimized.

The present invention is not, of course, limited to the above embodiment; it may be modified in various ways within the scope of the appended claims.

What is claimed is:

1. A juice extractor device comprising a juice extractor body which has a base end, an outer end, an upper side, a lower side, and a bore therewithin extending between said ends and having a horizontal axis, said body having an inlet port near said base end and on said upper side, a juice discharge port in said lower side below said axis and extending from near said outer end to near said base end, a residuum discharge port in said upper side above said axis and near said outer end, said bore having a substantially conical inner surface which is disposed concentrically with respect to said axis and increasing in diameter from said base end to said outer end of said body, a filter provided in said juice discharge port and having an inner surface the curvature of which is substantially the same as that of said inner surface of said bore, and a rotary body which is rotatably disposed in and extends along substantially the entire length of said bore of said juice extractor body in such a manner that said rotary body is opposed to all of said ports, said rotary body having its axis coincident with said horizontal axis of said bore and having an outer circumferential surface which has a spiral compressing portion and a spiral blade positioned adjacent said inlet port, said spiral blade having a valley formed therealong which increases sharply in diameter in the direction toward said outer end of said body, said compressing portion comprising a spiral wing continuing from said spiral blade, said spiral wing having a valley formed therealong which increases gradually in diameter in the direction toward said outer end of said body, a gap between said valley of said wing of said spiral compressing portion and the inner surfaces of said bore of said juice extractor body and said filter being established at not more than 6 mm along a major portion of its length and a gap between said spiral wing and said inner surfaces being established at not more than 2 mm, said gaps decreasing gradually in the direction toward said outer end of said juice extractor body.

* * * * *